United States Patent Office 2,952,134
Patented Sept. 13, 1960

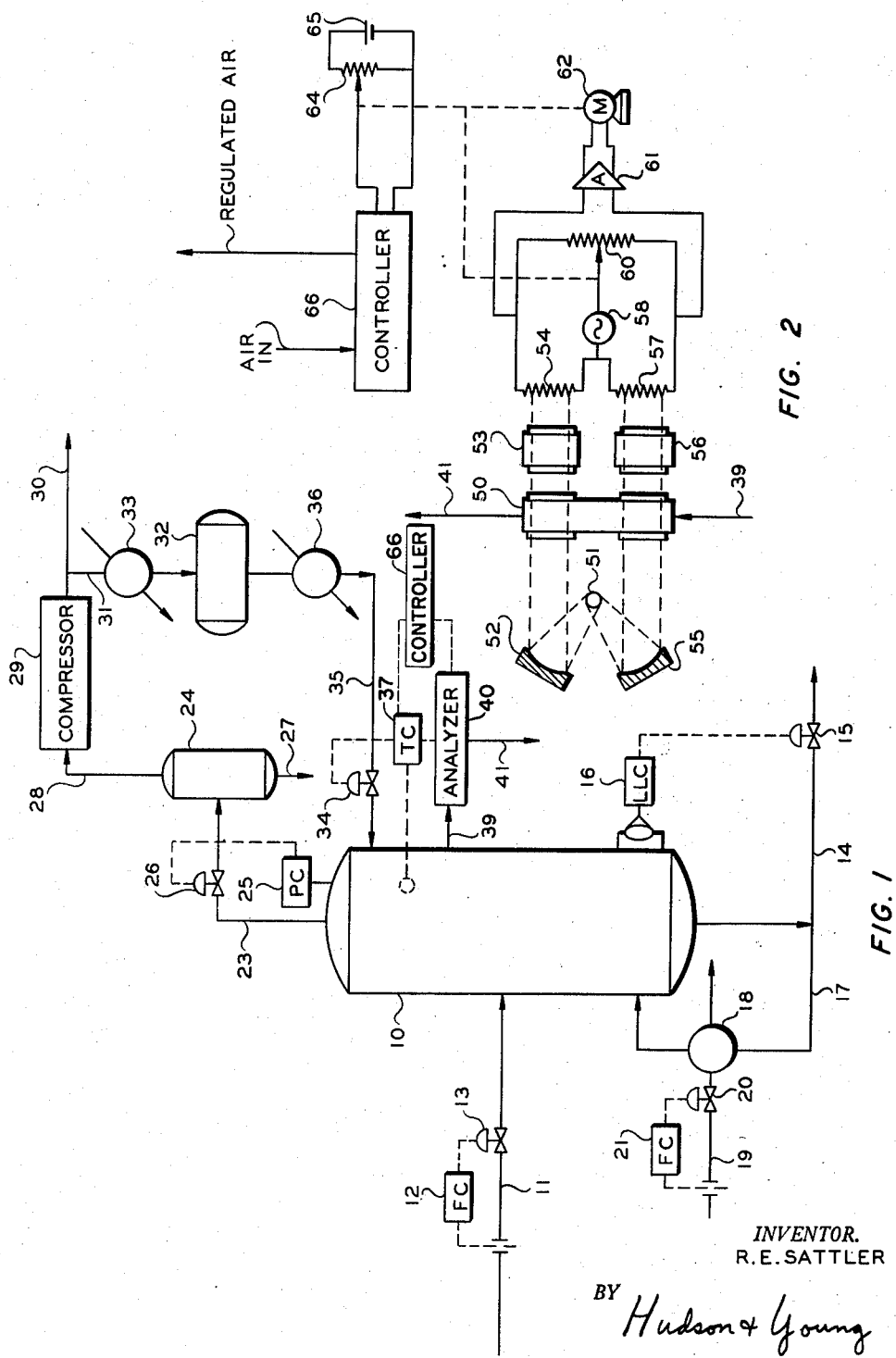

2,952,134
FLUID MIXTURE SEPARATION

Robert E. Sattler, Bartlesville, Okla., assignor to Phillips Petroleum Company, a corporation of Delaware Filed Apr. 2, 1956, Ser. No. 575,644

5 Claims. (Cl. 62—21)

This invention relates to the separation of fluid mixtures by fractionation.

It is known that ethylene can advantageously be produced commercially by thermally cracking light hydrocarbons, such as butane, propane, or ethane. Because a large number of other materials are formed by such a cracking process, it is necessary to separate the cracked effluent to obtain the desired ethylene product. One particular separation system which has been proposed involves initially removing constituents heavier than propylene in an absorption column. The resulting gaseous effluent is then passed through three fractionation columns operated as a demethanizer, a deethanizer and an ethylene fractionator, respectively. The feed to the final ethylene fractionator is essentially a binary mixture of ethylene and ethane. However, small amounts of methane may be present. If the feed were solely a binary mixture, the column could be controlled effectively by adjusting the reflux rate in response to a measurement of temperature in the upper region of the column. However, the presence of methane in the system complicates the control procedure. As long as the methane concentration remains constant, the temperature control is adequate. If the methane concentration in the feed stream should increase, however, the concentration of methane in the upper region of the column increases because the methane is removed with the overhead product. An increase in concentration of methane in the upper region of the column results in a lower temperature at this region. This lower temperature actuates the reflux control to decrease the rate of reflux. The increased methane content, in itself, decreases the purity of the overhead ethylene product, and the decreased reflux rate further decreases the overhead ethylene purity. The temperature control is thus not effective.

A control system is provided in accordance with the present invention which overcomes the difficulty previously mentioned. This control system is based upon an analysis of a sample in the upper region of the column to determine the ethane concentration. In response to this analysis, the temperature controller is reset to adjust the reflux rate. This serves to override the temperature control so that the ethane content in the upper region of the column remains within predetermined limits at all times.

Accordingly, it is an object of this invention to provide an improved method of and apparatus for controlling the separation of fluid mixtures by fractionation.

Another object is to provide a system for separating a first constituent from a second constituent of a fluid mixture in the presence of small amounts of a third constituent having a lower boiling point than either of the first two constituents.

Other objects, advantages and features of the invention should become apparent from the following detailed description which is taken in conjunction with the accompanying drawing in which:

Figure 1 is a schematic representation of a fractionator having the control system of this invention incorporated therein; and, Figure 2 is a schematic representation of an infrared analyzer which can be employed in the control system of Figure 1.

Referring now to the drawing in detail, and to Figure 1, in particular, there is a fractionation column 10, which is supplied with a feed mixture to be separated by means of an inlet conduit 11. The flow through conduit 11 is maintained at a predetermined rate by flow controller 12 which adjusts a valve 13. A kettle product stream is removed from the bottom of column 10 through an outlet conduit 14 which has a control valve 15 therein. Valve 15 is adjusted by a liquid level controller 16 which senses the liquid level in the bottom of column 10. A portion of the kettle product is directed by a conduit 17 through a reboiler 18 and returned to a lower region of column 10. A heating medium is directed through reboiler 18 by means of a conduit 19 which has a valve 20 therein that is adjusted by a flow controller 21.

Gases are removed from the top of column 10 through a conduit 23 which communicates with a separator 24. A predetermined pressure is maintained in column 10 by a pressure controller 25 which regulates a valve 26 in conduit 23. Any condensed materials are removed from separator 24 through a drain conduit 27. Gases are removed from separator 24 through a conduit 28 which communicates with the inlet of a compressor 29. An ethylene product outlet conduit 30 communicates with the outlet of compressor 29. A conduit 31 communicates between the outlet of compressor 29 and a surge tank 32. A condenser 33 is positioned in conduit 31. A conduit 35 extends from the outlet of tank 32 through a cooler 36 to the upper region of column 10. The rate of flow of reflux through conduit 35 is adjusted by a control valve 34 which is actuated by a temperature controller 37 in response to a measurement of temperature in the upper region of column 10.

A sample line 39 communicates between an upper region of column 10 and the inlet of an analyzer 40. The sample stream is vented from analyzer 40 through a conduit 41. Analyzer 40 is adapted to detect the concentration of ethane in the sample stream and to provide an output signal representative of this concentration. This output signal is applied through a controller 66 to reset temperature controller 37 so as to control valve 36 in such a manner as to maintain the measured ethane concentration within predetermined limits.

In order to explain more fully the operation of the control system of this invention, reference will be made to a particular separation of a feed stream containing primarily ethane and ethylene. This feed stream, which is introduced into column 10 through conduit 11, normally comprises primarily ethylene and ethane in a mole ratio of about 4½ to 1. Small amounts of methane, acetylene and propylene normally are present.

Column 10 is operated at an overhead pressure of 135 p.s.i.a., and a bottom pressure of 140 p.s.i.a. The overhead temperature is −65° F. and the bottom temperature is −28° F. The gases removed from compressor 29 are at a pressure of 310 p.s.i.a. and a temperature of 65° F. These gases are cooled by condenser 33 to a temperature of −18° F. The liquid removed from tank 32 is further cooled to a temperature of −55° F. before being returned to column 10 as reflux. Analyzer 40 is set to operate to increase the opening of valve 34 whenever the measured concentration of ethane increases above a set value. If the methane concentration in the upper region of column 10 should increase, the temperature controller tends to decrease the reflux rate. This increases the ethane concentration. Analyzer 40 detects this ethane increase. Valve 34 is then opened sufficiently to maintain the measured concentration less than the set value by increasing the reflux rate. Obviously, the indicated operating pressures and temperatures are merely representative of one possible mode of operation. These conditions depend upon the desired separation and the composition of the feed.

In Figure 2 there is illustrated an analyzer which can be employed to advantage as analyzer 40 in the control system of Figure 1. The analyzer of Figure 2 comprises a sample cell 50 through which the sample stream removed from column 10 is circulated. A first beam of infrared radiation from a source 51 is directed by a reflector 52 through cell 50 and a second cell 53 to impinge upon a first temperature sensitive resistance element 54. A second beam of radiation from source 51 is directed by a reflector 55 through cell 50 and a third cell 56 to impinge upon a second temperature sensitive resistance element 57. The analyzer is sensitized to measure the concentration of ethane in sample cell 50. This is accomplished by filling cell 53 with a pure sample of ethane. Cell 56 is filled with a non-absorbing gas, such as nitrogen. This cell functions merely to equalize the optical paths. It should be evident that an increase in concentration of ethane in sample cell 50 does not decrease the radiation impinging upon element 54 because cell 53 absorbs the wave lengths of radiation which are absorbed by the ethane in cell 50. However, an increase in ethane concentration in cell 50 increases the amount of radiation absorbed by the beam directed toward element 57. This changes the resistance of element 57 by changing the temperature thereof.

First terminals of elements 54 and 57 are connected to one another and to the first terminal of a voltage source 58. The second end terminals of elements 54 and 57 are connected to the respective end terminals of potentiometer 60. The contactor of potentiometer 60 is connected to the second terminal of voltage source 58. The second terminals of elements 54 and 57 are also connected to the respective input terminals of an amplifier 61. The output terminals of amplifier 61 are connected to a reversible servo motor 62. The circuit is adjusted so that motor 62 rotates in a first direction if the resistance of element 57 increases and rotates in a second direction if the resistance of element 57 decreases. The drive shaft of motor 62 is mechanically coupled to the contactor of potentiometer 60 to move this contactor in a direction to restore the bridge circuit to a balanced condition. The movement of the contactor of potentiometer 60 to restore this balance is indicative of the change in resistance of element 57. This, in turn, is a function of the change in ethane concentration in sample cell 50.

The drive shaft of motor 62 is also connected to the contactor of a telemetering potentiometer 64. A voltage source 65 is connected across the end terminals of potentiometer 64. The contactor and one end terminal of potentiometer 64 are connected to a controller 66. This controller can be the type of instrument which provides a regulated output air pressure representative of an input electrical signal thereto. Such a controller is described in Bulletin 15-2 (1942) of the Brown Instrument Company, Philadelphia, Pennsylvania, for example. This regulated output air pressure can be transmitted to temperature controller 37 of Figure 1 to reset the control point of this controller. This, in turn, adjusts the setting of control valve 34. Controller 37 can be a conventional air-operated controller with reset such as is described in Catalog No. 8904 (1943) of said Brown Instrument Company, for example.

It should be evident that the control system of this invention is not restricted to any particular ethane analyzer. The illustrated infrared analyzer can be employed to advantage to measure the concentration of ethane, but other known analyzers can also be employed for this purpose. A mass spectrometer, for example, is another instrument which can be so used.

It should be evident that the principles of this invention are not restricted to the particular ethane-ethylene separation herein described. The invention can be employed to advantage whenever it is desired to separate first and second constituents of a fluid mixture which may also contain small amounts of a third constituent having a boiling point lower than the boiling point of the first and second constituents.

While the invention has been described in conjunction with a present preferred embodiment, it should be evident that it is not limited thereto.

What is claimed is:

1. The method of separating a fluid mixture including first, second and third components having progressively lower boiling points in the order named which comprises passing a stream of such a mixture into a fractionation zone, withdrawing an overhead stream from said zone, condensing at least a portion of said overhead stream and returning same to said zone as reflux, withdrawing a bottoms stream from said zone, measuring the temperature in an upper region of said zone, regulating the rate of flow of reflux to said zone in response to the temperature measurement to tend to maintain the measured temperature constant, withdrawing a sample stream from an upper region of said zone, measuring the amount of said first component in said sample stream, and further controlling the rate of flow of reflux to said zone responsive to the last-mentioned measurement to tend to maintain the concentration of said first component less than a predetermined value.

2. The method of separating a fluid mixture comprising ethane and ethylene and which may contain small amounts of methane which comprises passing a stream of such a mixture into a fractionation zone, withdrawing an overhead stream from said zone, condensing at least a portion of said overhead stream and returning same to said zone as reflux, withdrawing a bottoms stream from said zone, measuring the temperature in an upper region of said zone, regulating the rate of flow of reflux to said zone in response to the temperature measurement to tend to maintain the measured temperature constant, withdrawing a sample stream from an upper region of said zone, measuring the concentration of ethane in said sample stream, and further controlling the rate of flow of reflux to said zone responsive to the measurement to maintain the measured concentration of ethane less than a predetermined value.

3. In a system adapted to separate a fluid mixture including first, second and third components having progressively lower boiling points in the order named comprising a fractionation column, means to introduce such a fluid mixture into said column, means to withdraw an overhead stream from said column, means to condense at least a portion of the withdrawn overhead stream and to return same to said column as reflux, and means to withdraw a bottoms stream from said column; control apparatus comprising means to measure the temperature in an upper region of said column, means responsive to said means to measure temperature to control the rate of flow of reflux to said column, means to withdraw a sample stream from an upper region of said column, means to analyze said sample stream to measure the concentration of said first component, and means responsive to said means to analyze to override said means to control to maintain the concentration of said first component in said sample stream less than a predetermined value.

4. Apparatus to separate a fluid mixture including first, second and third components having progressively lower boiling points in the order named comprising a fractionation column, means to introduce such a fluid mixture into said column at a predetermined rate, means to withdraw a gaseous overhead stream from said column at such a rate as to maintain a constant pressure in said column, means to supply heat to said column at a predetermined rate, means to withdraw a bottoms stream from said column at a rate such as to maintain a constant liquid level in said column, means to condense at least a portion of said gaseous overhead stream and to return same to said column as reflux, means to measure the temperature in an upper region of said column, means responsive to said means to measure temperature to control the rate of flow of reflux to said column, means to withdraw a sample stream from an upper region of said column, means to analyze said sample stream to measure the concentration of said first component, and means responsive to said means to analyze to override said means to control to maintain the concentration of said first component in said sample stream less than a predetermined value.

5. Apparatus to separate a fluid mixture including first, second and third components having progressively lower boiling points in the order named comprising a fractionation column, means to introduce such a fluid mixture into said column at a predetermined rate, means to supply heat to said column at a predetermined rate, means to withdraw a bottoms stream from said column at a rate such as to maintain a constant liquid level in said column, means to withdraw a gaseous overhead stream from said column at such a rate as to maintain a constant pressure in said column, means to compress said overhead stream, means to cool a portion of the compressed stream, means to return the cooled stream to said column as reflux, means to measure the temperature in an upper region of said column, means responsive to said means to measure temperature to control the rate of flow of reflux to said column, means to withdraw a sample stream from an upper region of said column, means to analyze said sample stream to measure the concentration of said first component, and means responsive to said means to analyze to override said means to control to maintain the concentration of said first component in said sample stream less than a predetermined value.

References Cited in the file of this patent

UNITED STATES PATENTS

| | | | |
|---|---|---|---|
| 2,156,234 | Bays | Apr. 25, | 1939 |
| 2,336,097 | Hutchinson | Dec. 7, | 1943 |
| 2,475,957 | Gilmore | July 12, | 1949 |
| 2,553,469 | Pellettere | May 15, | 1951 |
| 2,599,133 | Schilling | June 3, | 1952 |
| 2,673,297 | Miller | Mar. 23, | 1954 |
| 2,697,789 | Skarstrom | Dec. 21, | 1954 |
| 2,703,844 | Miller | Mar. 8, | 1955 |
| 2,721,942 | Friel | Oct. 25, | 1955 |
| 2,762,208 | Dennis | Sept. 11, | 1956 |
| 2,764,536 | Hutchins | Sept. 25, | 1956 |
| 2,835,116 | Miller | May 20, | 1958 |
| 2,885,863 | Berger | May 12, | 1959 |

FOREIGN PATENTS

| | | | |
|---|---|---|---|
| 164,584 | Australia | Aug. 15, | 1955 |